(12) United States Patent
Kong (10) Patent No.: US 7,290,060 B2
(45) Date of Patent: Oct. 30, 2007

(54) NETWORK-CONNECTING APPARATUS AND METHOD FOR PROVIDING DIRECT CONNECTIONS BETWEEN NETWORK DEVICES IN DIFFERENT PRIVATE NETWORKS

(75) Inventor: Won-keun Kong, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 812 days.

(21) Appl. No.: 10/379,674

(22) Filed: Mar. 6, 2003

(65) Prior Publication Data

US 2003/0172184 A1    Sep. 11, 2003

(30) Foreign Application Priority Data

Mar. 7, 2002 (KR) .......................... 2002-0012219

(51) Int. Cl.
G06F 15/16 (2006.01)
(52) U.S. Cl. ....................... 709/245; 709/249; 709/238; 370/352; 370/389
(58) Field of Classification Search ................ 709/245, 709/203, 217, 238, 250, 225–226, 249; 370/352, 370/389
See application file for complete search history.

(56) References Cited

U.S. PATENT DOCUMENTS

| 5,777,989 | A  | * | 7/1998  | McGarvey ................... 370/254 |
| 6,393,488 | B1 |   | 5/2002  | Araujo |
| 6,445,922 | B1 | * | 9/2002  | Hiller et al. ................. 709/238 |
| 6,515,974 | B1 | * | 2/2003  | Inoue et al. ................. 370/352 |
| 6,523,068 | B1 | * | 2/2003  | Beser et al. ................. 709/245 |
| 6,708,219 | B1 | * | 3/2004  | Borella et al. ............... 709/245 |
| 6,781,982 | B1 | * | 8/2004  | Borella et al. ............... 370/352 |
| 6,801,523 | B1 | * | 10/2004 | Osman ........................ 370/352 |
| 6,810,417 | B2 | * | 10/2004 | Lee ............................. 709/238 |
| 6,948,003 | B1 | * | 9/2005  | Newman et al. ............ 709/250 |
| 6,967,954 | B2 | * | 11/2005 | Sugiyama ............... 370/395.52 |
| 7,072,323 | B2 | * | 7/2006  | Roberts et al. ............. 370/338 |
| 2002/0026528 | A1 | * | 2/2002 | Lo ............................. 709/245 |
| 2002/0061011 | A1 | * | 5/2002 | Wan ........................... 370/352 |
| 2002/0067731 | A1 | * | 6/2002 | Houston et al. ............ 370/401 |
| 2002/0101859 | A1 | * | 8/2002 | Maclean .................... 370/352 |
| 2002/0103931 | A1 | * | 8/2002 | Mott ........................... 709/245 |

(Continued)

FOREIGN PATENT DOCUMENTS

JP    11-112577 A    4/1999

(Continued)

OTHER PUBLICATIONS

Launoise De C et al.: Connection of Extruded Subnets: A Solution Based on RSIP:, IEEE Communications Magazine, IEEE Service Center, Piscataway, N.J, US, vol. 40, No. 9, Sep. 2002, pp. 116-121, XP001124128.

*Primary Examiner*—Philip Tran
(74) *Attorney, Agent, or Firm*—Sughrue Mion Pllc.

(57) ABSTRACT

A network-connecting apparatus for a first private network having a first network device. The apparatus includes a direct connection part for providing a direct connection in response to a connection request from the first network device, said request being a request to connect to a second network device in a second private network. Further, an address change part is provided for changing subnet numbers of origination and destination addresses of a packet transferred outside the first private network through the direct connection.

8 Claims, 5 Drawing Sheets

U.S. PATENT DOCUMENTS

| | | | |
|---|---|---|---|
| 2002/0133534 A1* | 9/2002 | Forslow | 709/223 |
| 2003/0048804 A1* | 3/2003 | Inouchi et al. | 370/466 |
| 2003/0112808 A1* | 6/2003 | Solomon | 370/395.52 |
| 2003/0154306 A1* | 8/2003 | Perry | 709/245 |

FOREIGN PATENT DOCUMENTS

JP  2000-228674 A  8/2000

* cited by examiner

NETWORK-CONNECTING APPARATUS AND METHOD FOR PROVIDING DIRECT CONNECTIONS BETWEEN NETWORK DEVICES IN DIFFERENT PRIVATE NETWORKS

BACKGROUND

This Application claims priority from Korean Patent Application No.2002-12219, the disclosure of which is incorporated herein by reference.

1. Field

This disclosure is related to a network-connecting apparatus and method. Specifically, techniques related to a network-connecting apparatus and method for providing direct connections between network devices in a first arbitrary private network and network devices in a second arbitrary private network are taught.

2. Description of the Related Art

A device for IP communication over the Internet requires an IP address that is unique and distinguishable from another device. The IP addresses that are presently allocated and used based on a code that is 32 bits long. However, with the increase in demand for devices to be hooked up to the Internet, a shortage of newly allocable IP addresses is anticipated. A scheme of using private IP addresses has been developed and employed to overcome this problem.

Private IP addresses are allocated on the condition that certain parts of the entire IP addresses can be used for tests or in local areas. Therefore these private addresses are freely usable for certain purposes. However, regulations prohibit packets having a private IP address from being transferred to a public network. An example of such a public network is the Internet. An IP address that can be used in the public networks is called a public IP address. Devices using a private IP address have various limitations. Likewise, the devices using public IP address have various other limitations, which could be different from the ones for devices with private IP addresses.

Private and public networks are connected to one another through a gateway. Each gateway is dynamically allocated one public IP address. More public IP addresses are not allocated at least because that would increase the costs. That is, an Internet Service Provider (ISP) provides a public IP address for a gateway. This public IP address is required for connecting the gateway to the public network. Further, in a private network having a plurality of network devices, a public IP address is allocated to (and used for) the gateway only. For network devices other than the gateway, arbitrary private IP addresses are internally allocated. For ensuring complete communication access with other network devices it is desirable that a device that uses a private IP address performs at least the following different tasks.

(1) It should be capable of communicating with another device inside a private network.

(2) It should be capable of connecting with a public network.

(3) A device from a public network should be able to communicate with it.

(4) It should be capable of communicating with a device in another private network.

In case (1), no obstacles exist and smooth communications are possible. In case (2), network address translation (NAT) or network address port translation (NAPT) techniques are used to translate a private IP address in a packet header to a public address as the packet is transferred from a private network to a public network. The case (3) is possible since a gateway provides a Virtual Private Network (VPN) service for connections that are requested from a public network. However, case (4) cannot be achieved with the aforementioned NAT/NAPT or VPN technology, and no conventional solutions exist.

The disclosed teachings are aimed at overcoming some of the disadvantages noted above in conventional techniques. Techniques are provided for connecting private networks dispersed in the Internet and for enabling smooth communications among devices using private IP addresses

SUMMARY

This disclosure teaches a network-connecting apparatus for a first private network having a first network device. The apparatus comprises a direct connection part for providing a direct connection in response to a connection request from the first network device, said request being a request to connect to a second network device in a second private network. Further, an address change part is provided for changing subnet numbers of origination and destination addresses of a packet transferred outside the first private network through the direct connection.

In another specific enhancement, the direct connection part comprises an address acquisition part for acquiring a public IP address of the second private network from a domain name management server based on a domain name of the second network device received from the first network device, and for acquiring a private IP address of the second network device based on the received domain name. A connection management part is provided for connecting to the second private network based on the acquired public IP address and forming a tunnel with the second private network.

More specifically, an address mapping part is provided for converting the acquired public IP address and the acquired private IP address into an address system used in the first private network in case an address system used for the public IP address of the second private network is different from the address system used for the public IP address of the first private network.

More specifically the address change part comprises a number acquisition part for receiving a unique tunnel number from the second private network, said tunnel number being allocated to the tunnel. A change part is provided for changing the subnet number of the origination address of the packet transferred outside the first private network through the direct connection to the tunnel number, and for changing the destination address of the packet to the acquired private IP address.

In another specific enhancement, a registration request part is provided for requesting a registration of a public IP address from a domain name management server, said public address being allocated from a unique domain name and internet service providing device through a communication network.

In another specific enhancement, the direct connection part includes a connection management part for forming a tunnel with the second private network having the second network device.

In another specific enhancement, the address change part comprises a number assignment part for assigning a unique tunnel number to the tunnel. A change part is provided for changing a subnet number of the origination address of the packet transferred outside the first private network through the direct connection to the tunnel number, and for changing the destination address of the packet to a private IP address of the first network device.

More specifically, the number assignment part assigns a number that is not a subnet number of the private IP address allocated to the second network device.

In another specific enhancement, an authentication part is provided for authenticating the second network device, wherein the direct connection part provides a direct connection in case of receiving a connection approval signal from the authentication part.

Another aspect of the disclosed teaching is a method for establishing connection between a first network device in a first private network and a second network device in a second private network. The method comprises providing a direct connection in response to a connection request from the first network device to be connected to the second network device. A private IP address of the second network device is acquired. The subnet number of an origination address of a packet transferred outside the first private network through the direct connection is changed. A destination address of the packet is changed to the private IP address of the second network device.

In another specific enhancement, the direct connection includes acquiring a public IP address of the second private network from a domain name management server based on a domain name of the second network device received from the first network device. Connection is made to the second private network based on the acquired public IP address. A tunnel is formed with the second private network.

In another specific enhancement, the direct connection further includes receiving a unique tunnel number allocated to the tunnel from the second private network. The subnet number of the origination address of the packet is changed to the tunnel number.

In another specific enhancement, prior to changing, the acquired public IP address and acquire private IP address are mapped into an address system used in the first private network address in case the address system used for the public address by the first private network is different from an address system used for the public IP address in the second private network.

In another specific enhancement, prior to direct connection, a domain name management server is requested to register a public IP address allocated from a unique domain name and internet service providing device through a communication network.

In another specific enhancement, the direct connection includes forming a tunnel with the second private network having the second network device. A unique tunnel number is allocated to the tunnel.

DETAILED DESCRIPTION

Hereinafter, a network-connecting apparatus and method according to exemplary implementations of the disclosed teachings will be described in detail with reference to accompanying drawings. Like reference numerals indicate like constituents respectively in drawings.

Figure 1:
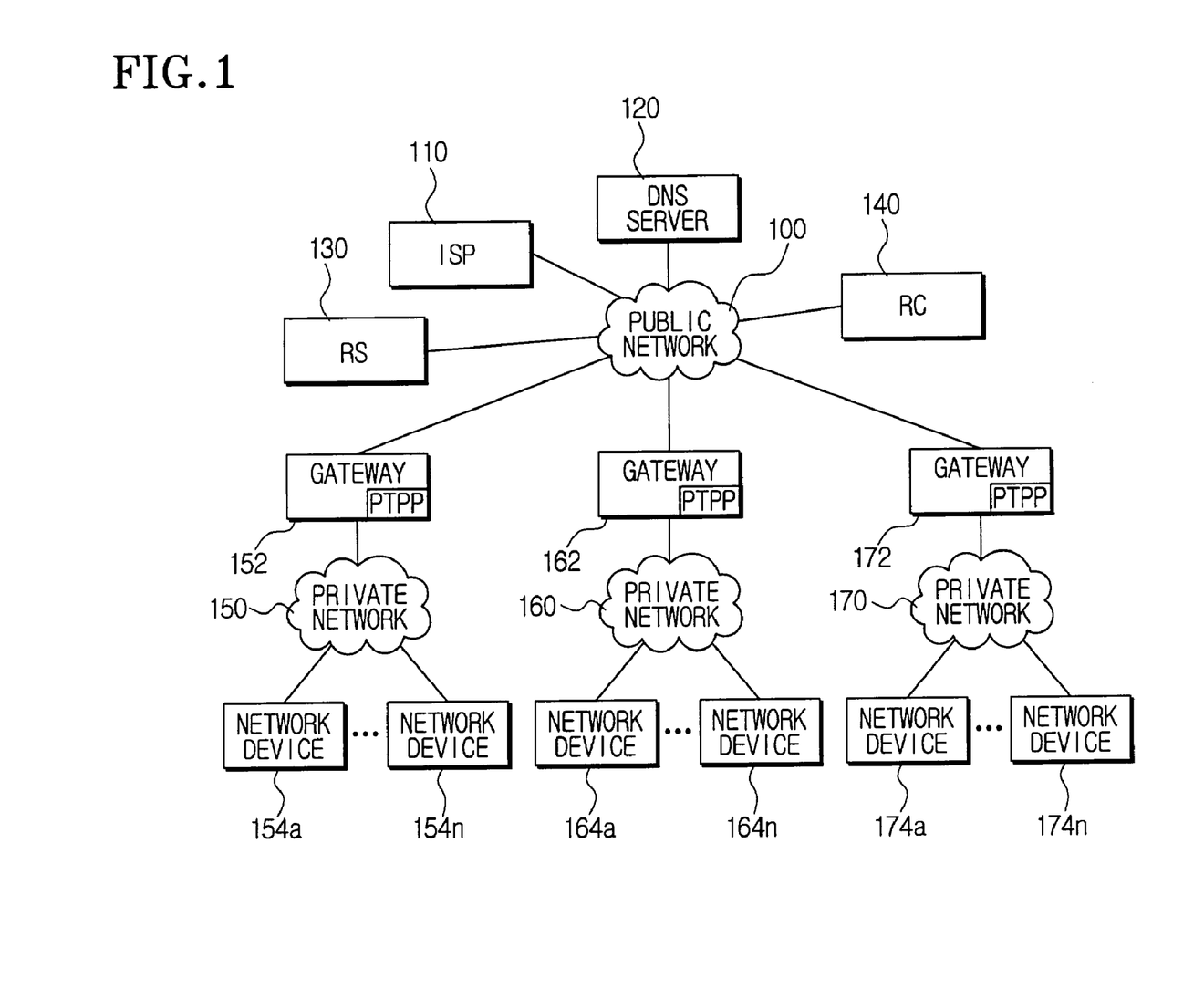
FIG. 1 shows a structure of a network formed with network-connecting apparatuses according to an exemplary implementation of the disclosed teachings.

FIG. 1 shows a structure of a network formed with network-connecting apparatuses according to an exemplary implementation of the disclosed teachings.

In FIG. 1 an Internet Service Provider (ISP) 110, a Domain Name Server (DNS) 120, a Remote Server (RS) 130, a Remote Client (RC) 140, and plural gateways 152, 162, and 172, are connected to a public network 100. This public network could be the Internet.

Gateway 152 acts as a passageway connecting the public network 100 and private network 150. Likewise, 162, and 172 act as passageways connecting private networks, 160, and 170, respectively, to the public network 100. Private networks 150, 160, and 170 are connected to the gateways 152, 162, and 172 respectively. They are also connected to network devices 154a to 154n, 164a to 164n, and 174a to 174n, respectively.

The ISP 110 dynamically allocates public IP addresses in order to enable the respective gateways 152, 162, and 172 to connect to the Internet 100. Dynamic allocation in this context means that the same address need not be allocated to a gateway each time a new allocation is performed for the gateway.

The domain name server 120 links an internet address to a name. The address is denoted by numbers, whereas the name is usually denoted by characters familiar to users. That is, the domain name server 120 stores and provides, to users, relations between continuously varying public IP addresses of the gateways 152, 162, and 172 and unique character names. Because of this, the users can easily recognize the public IP addresses of the gateways 152, 162, and 172 to which the users request a connection based on the names of corresponding gateways 152, 162, and 172.

The RS 130 is a general remote server providing services through the Internet 100. The RC 140 is a general client devices using a public IP address.

The gateways 152, 162, and 172 are network-connecting apparatuses connecting the public network 100 and the private networks 150, 160, and 170. It should be noted that the gateways have both public IP addresses and private addresses. The gateways 152, 162, and 172 employ a public IP address while connecting to the public network 100. On the other hand, these gateways use private IP addresses while connecting to the private networks 150, 160, and 170. The respective network devices 154a to 154n, 164a to 164n, and 174a to 174n form part of the private networks 150, 160, and 170, respectively. They use private IP addresses and they can be operated as servers or clients.

Figure 2:
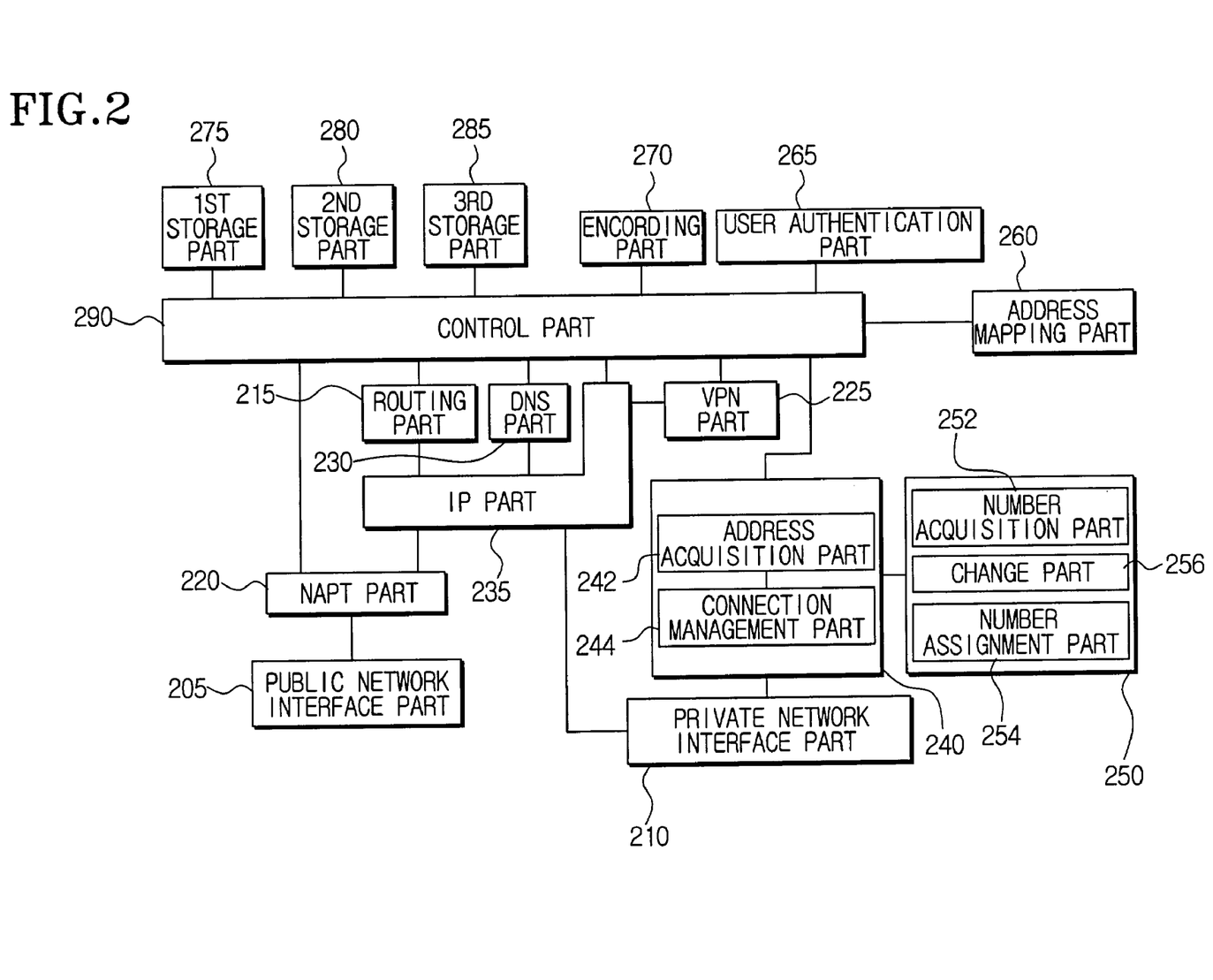
FIG. 2 is a block diagram of an internal structure of a network-connecting apparatus according to an exemplary implementation of the disclosed teachings.

FIG. 2 is a block diagram showing an internal structure of a network-connecting apparatus according to an exemplary implementation of some aspects of the disclosed teachings.

In FIG. 2, the gateway 152 has a public network interface part 205, a private interface part 210, a routing part 215, a network address port translation (NAPT) part 220, a VPN part 225, a DNS part 230, an IP part 235, a direct connection part 240, an address change part 250, an address mapping part 260, a user authentication part 265, an encoding part 270, a first storage part 275, a second storage part 280, a third storage part 285, and a control part 290.

The public network interface part 205 is connected to the internet 100 through the ISP 110 and provides an interface with a broadband access network. The broadband access could be provided through Asymmetric Digital Subscriber Line (ADSL), a Cable Modem, and the like. The private network interface part 210 provides an interface with the private network 150 and employs an interface device with a LAN network having IP transfer capacity. In case the network devices 154a to 154n, that form part of the private network 150, are connected to another private network 160, the private interface part 210 modifies the address part of the packet from or to the IP part 235 with the information from the direct connection part 240. However, in other cases, the packets from or to the IP part 235 are not modified.

The IP part 235 is in charge of receiving and transferring data between the network devices 154a to 154n in the private network 150 and the network devices 154a to 154n joined in the Virtual Private Network (VPN), also the IP part 235 is in charge of receiving and transferring data between the devices 154a to 154n in the private network 150 and the RC 140 in public network. The routing part 215 performs a function of transferring data received or data to be transferred to the right destinations.

The NAPT part 220 is positioned between the public interface part 205 and the IP part 235 and translates private IP addresses into a public IP address in order to enable the plural network devices 154a to 154n that form part of the private network 150 to be connected to the Internet using only one shared public IP address. The information required for the translation are stored and updated in a NAPT translation table that is stored in the first storage part 275.

The VPN part 225 forms a tunnel in order for the RS 130 and RC 140 connected to the Internet 100 to be connected to the private network 150. Likewise the VPN part 225 also forms a tunnel in order for the network devices 164a to 164n in a second private network 160 to be connected to the private network 150. In addition, the VPN part 225 allocates private IP addresses to the RS 130, the RC 140, and the network devices 164a to 164n in the second private network 160 which are connected through the tunnel. Further, the VPN part 225 also forms a tunnel for the gateway 160 of the second private network 160 in order for the network devices 154a to 154n that form part of the private network 150 to be connected to the second private network 160.

The DNS part 230 operates as a DNS server for the private network 150. Further, on initializing the system, the DNS part 230 requests a public IP address from the ISP 110. The DNS part 230 then registers the public IP address allocated from the ISP 110 and correlates it with a unique domain name of the private network 150. The public IP address and the name are registered with the domain name server 120 connected to the internet 100.

The direct connection part 240 provides direct connections between the network devices 154a to 154n inside the private network 150 and the network devices 164a to 164n that are outside the private network 150 and form part of a second private network 160. The direct connection part 240 has an address acquisition part 242 and a connection management part 244. The address acquisition part 242 acquires a public IP address from the Domain Name Server 120. For example, 208.229.23.30, is a public IP address of the private network 160 to be connected. This could be based on a domain name of the network device 164a, such as "lion-.printer" that formed part of the network 160 that is waiting to be connected. This domain name is received from the network device 154a that forms part of the private network 150. The connection management part 244 is connected to a gateway of the private network 160 (that is waiting to be connected), on a basis of the acquired IP address, to form a tunnel.

If the tunnel with the to-be-connected private network 160 is formed, the address acquisition part 242 transfers the domain name of the network device 164a (the device whose connection is desired) to the gateway of the to be-connected private network 160. The address acquisition part 242 receives a private IP address of the corresponding network device 164a from the corresponding gateway 162. The address acquisition part 242 changes a subnet number of the private IP address of the corresponding network device 164a to a tunnel number. The address acquisition part 242 then transfers the tunnel number to the network device 154a requesting the connection.

The connection-requesting network device 154a grasps that IP packets to be sent to the to-be-connected network device 164a and then transfer them to the gateway 162 of the private network 160 to which the network device 164a belongs. The transfer is done using the process of Address Resolution Protocol (ARP) and is based on the changed private IP address of the to-be-connected network device 164a that is transferred to 154a. In order for two hosts to communicate in a virtual network, physical network addresses should be obtained from the respective hosts and then matched with IP addresses. The ARP is a protocol that performs a broadcast function in a network such as the Ethernet.

The private IP address of the to-be-connected network device 164a received from the gateway 162 of the private network to be connected is recorded in a translation table stored in the second storage part 275. Likewise, the private IP address of the connection-requesting network device 154a, and the tunnel number are also recorded in the translation table stored in the second storage part 275.

The connection-requesting network device 154a produces an IP packet designating a destination address. This designating address is formed by changing a subnet number of the private IP address of the to-be-connected network device 164a changed in a subnet number. It then makes a transfer request. The address change part 250 changes a subnet number of an originating address of the produced IP packet to a tunnel number. It also changes the destination address of the produced IP packet to a private IP address of the to-be-connected network device 154a. In the meantime, the address change part 250 reads out the private IP address of the to-be-connected network device 164a, the private IP address of the connection-requesting network device 154a, and the tunnel number from the translation table stored in the second storage part 280 and performs an address change process.

The address change part 250 has a number acquisition part 252, a number assignment part 254, and a change part 256. The number acquisition part 252 receives a unique tunnel number which is assigned to a tunnel formed from the gateway 162 of the to-be-connected private network 160. The number assignment part 254 provided in the gateway 162 of the to-be-connected private network 160 assigns the tunnel number. When the gateway 162 of the to-be-connected private network 160 assigns a tunnel number, the gateway 162 considers a sub-netting method of the private network 160 corresponding to the gateway 162. That is, subnet numbers not assigned to the network devices 164a to 164n existing in the private network 160 corresponding to the gateway 162 are assigned as tunnel numbers. It is preferable that the number acquisition part 252 and the number assignment part 254 must cooperate to make the unique tunnel number. The change part 256 changes the origination and destination addresses of an IP packet.

If two gateways 152 and 162 use the same sub-netting method, all subnet numbers not assigned from both private networks 150 and 160 only may be assigned as tunnel numbers. In the meantime, when the gateway 162 of the to-be-connected private network 160 assigns tunnel numbers, the gateway 162 may exchange sub-netting information with a connection-requesting gateway 152. This exchange of information is done such that the subnet numbers not used in both the gateways 152 and 162 can be used as tunnel numbers. In either case, it is desirable that the subnet numbers of private IP addresses used in the respective private networks 150 and 160 are fixed. This is done such that the subnet numbers not allocated in the respective private networks 150 and 160 can be allocated as tunnel numbers.

Information on the origination and destination addresses is generally included in an IP packet header. However, some network codes require that information about an address is included in a payload portion of an IP packet. Therefore, it is desirable that the gateway 152 has a packet identification part (not shown). This packet identification part can extract IP address information from an IP packet transferred from a private network in accordance with such network codes.

An IP packet in which an address change is completed is transferred to the gateway 162 of the to-be-connected private network 160 through a tunnel formed between the respective private networks 150 and 160. The gateway 162 of the to-be-connected private network 160 transfers a received IP packet to the to-be-connected network device 164*a*.

In some instances an IP address system used in the private network 150 to which the connection-requesting network device 154*a* belongs is different from an IP address system used in the private network 160 to which the to-be-connected network device 164*a* belongs, for example IPv4. In such a case, the address mapping part 260 converts the address into a particular IP address system such as IPv6. The conversion of an IP address system employs a method using a router and a domain name server which support both IPv4 and IPv6. It also employs a method for encapsulating an IPv6 diagram in an IPv4 packet, and so on. Detailed descriptions of these methods are omitted since they are well known to one skilled in the art.

A user authentication part 265 carries out an authentication process when connection requests originate from network devices 164*a* to 164*n*, RS 130, and RC 140, that do not form part of the private network 150. User information necessary for user authentications is stored in the third storage part 285. Preferably, the direct connection part 240 forms a tunnel and provides a direct connection in case of receiving a connection approval signal for a network device such as the network device 164*a* requesting a connection from the user authentication part 265.

The encoding part 270 encodes data in case such additional security is required for packets communicating with devices connected to the Internet 100. Further, the encoding part 270 decodes the data received through the Internet 100. Information necessary to carry out the encoding and decoding of packets in the encoding part 270 is stored in the third storage part 285. The control part 290 controls the operations of the respective constituents of the overall system.

Figure 3:
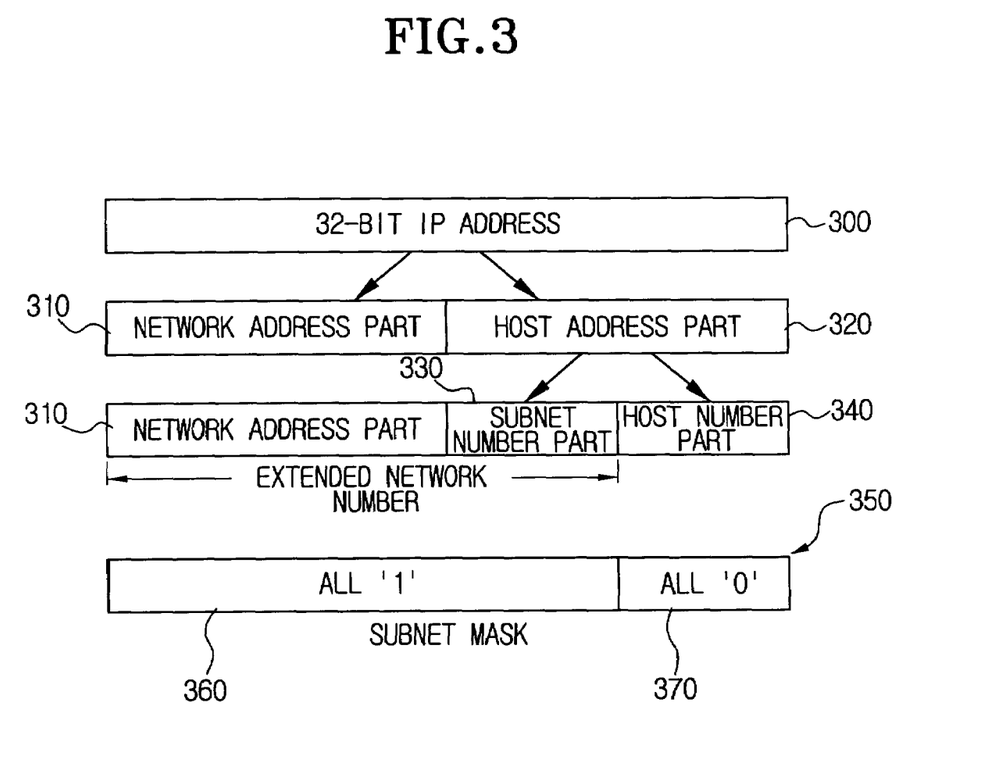
FIG. 3 shows an IP address structure and a subnet mask according to the IPv4.

FIG. 3 shows an IP address structure and a subnet mask according to the IPv4 protocol.

In FIG. 3, an IP address is structured with a network address part 310 and a host address part 320. A network is normally separated internally into several segments for better management. At this time, the host address part 320 of the IP address 300 is divided into a subnet number part 330 and a host number part 340. The subnet mask 350 is used to designate a broadcasting range. Basically, the communication method of the Local Area Network (LAN) is the broadcasting method, separating one network class into plural network segments using subnet masking. This enables IP addresses to be efficiently used. FIG. 3 shows a subnet mask 350 set to 255.255.255.0. Therefore, the subnet number part 330 of a 32-bit IP address 300 is included in a network number.

Figure 4:
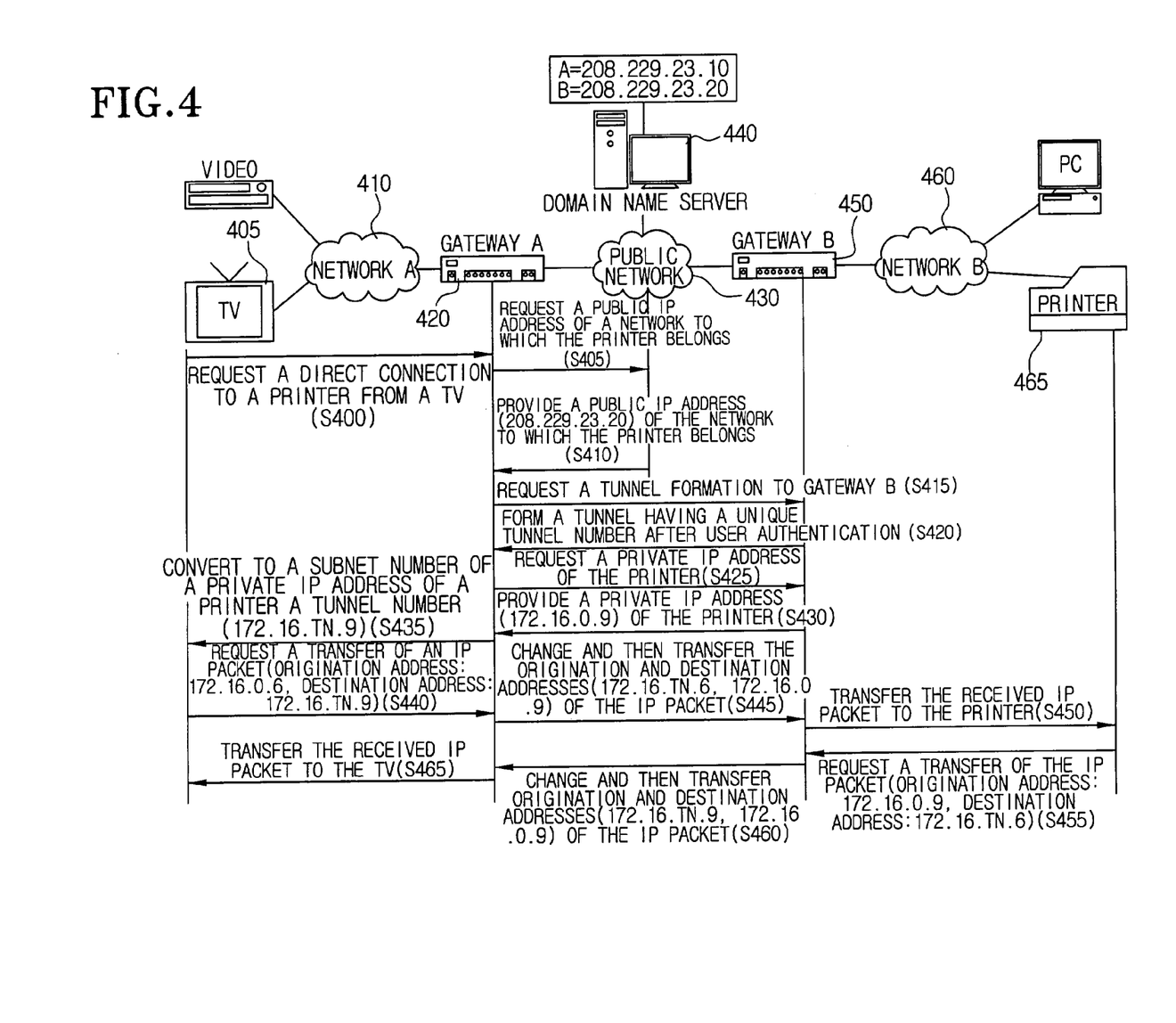
FIG. 4 shows a process of direct connections among network devices in different private networks by a network-connecting method according to an exemplary implementation of the disclosed teachings.

FIG. 4 shows a process of direct connections among network devices existing in different private networks by a network-connecting method according to an exemplary implementation of some aspects of the disclosed teachings.

In FIG. 4, a TV 405 that is part of a network A 410 having a domain name of tiger.tv requests a direct connection to a printer 465 existing in a network B 460 and having a domain name of lion.printer (S400). Both the TV 405 and the printer 465 have network functions. The TV 405 transfers the domain name of the printer 465 to a gateway A and makes the request. The gateway A 420 transfers the domain name of the printer 465 to a domain name server 440 holding public IP addresses of the network A 410 and network B 460. It then requests a public IP address of a private network to which the printer 465 belongs (S405). The domain name server 440 provides the public IP address of the network B corresponding to the domain name of the printer 465 transferred from the gateway A 420 to the gateway A 420 (S410).

The gateway A 420 connects to the gateway B 450 and requests a tunnel formation (S415).

The gateway B 450 creates a tunnel having a unique tunnel number TN (S420). Prior to creating the tunnel, the gateway B 450 carries out a user authentication process and checks if TV 405 requesting the connection has the necessary connection authority. The tunnel is created only if such an authorization exists.

The gateway B 450 allocates the subnet numbers not assigned to network devices, existing in the network B 460, as tunnel numbers. If the respective networks 410 and 460 use the same sub-netting method, the subnet numbers not allocated in all of the respective networks 410 and 460 may be allocated as tunnel numbers.

When the gateway B 450 allocates a tunnel number, the gateway B 450 exchanges sub-netting information with the gateway A 420 and then allocates as a tunnel number a subnet number not used in all of the respective networks 410 and 460. In either case, the subnet number parts of private IP addresses used in the respective networks 410 and 460 are preferably fixed so that a subnet number not assigned in the respective networks 410 and 460 can be allocated as a tunnel number.

Once a tunnel is formed, the gateway A 420 requests a private IP address of the printer 465 to the gateway B 460 (S425). The gateway B 460, in response to the request, provides a private IP address 172.16.0.9 of the printer 465 to the gateway B 420 (S430). The gateway A 420 converts the provided subnet number of the private IP address of the printer 465 to a tunnel number and then transfers the tunnel number to the TV 405 (S435).

The TV 405 requests a transfer of IP packets in which its own private IP address and the converted private IP address of the printer 465 transferred from the gateway A 420 are recorded as the origination and destination addresses respectively (S440). The origination and destination addresses of the IP packet transferred to the gateway A 420 from the TV 405 are 172.16.0.6 and 172.16.TN.9 respectively. In this case, TN is the allocated tunnel number. The gateway A 420 converts a subnet number of the origination address of the IP packet received from the TV 405 to a tunnel number, changes the destination address to a private IP address of the printer 465, and transfers the IP packet to the gateway B 450 (S445). Through such a conversion process, the origination and destination addresses of the IP packet transferred to the gateway B 450 from the gateway A 420 are converted into 172.16.TN.6 and 172.16.0.9 respectively.

The gateway B 460 transfers the received IP packet to the printer 465 (S450). After carrying out the step S450, in case that there is a transfer request of the IP packet from the printer 465 to the TV 405 or from the TV 405 to the printer 465, the respective gateways 420 and 460 carries out the steps S440 to S450 to provide direct communications between the TV 405 and the printer 465 (S455 to S465).

Figure 5:
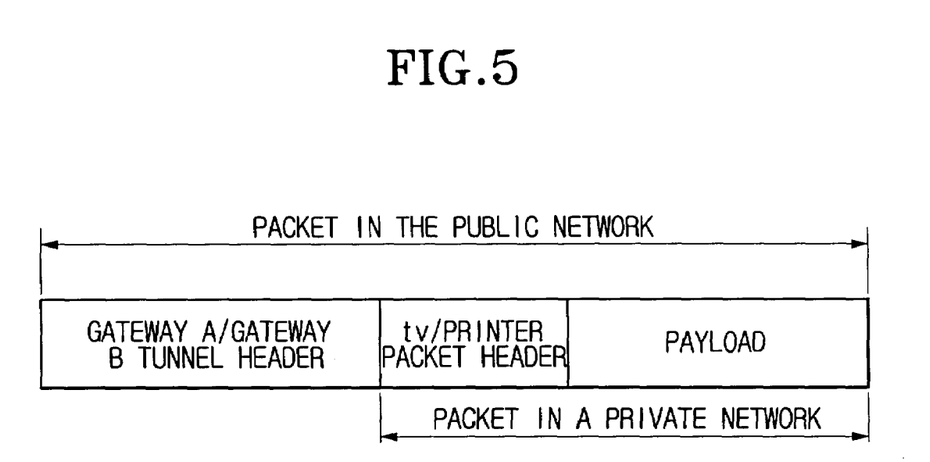
FIG. 5 shows an IP packet structure passing through a tunnel formed between different private networks.

FIG. 5 shows an IP packet passing through a tunnel formed between the gateway A 420 and the gateway B 460. The respective gateway 420 and 460 processes the exchange of an IP packet header tunnel number and a subnet number in the packet header of the TV/printer in a private network.

In the above exemplary implementation of the disclosed teachings, the description has been made on packet exchanges through a direct connection among network devices existing in a network having an address system according to the IPv4. However, one skilled in the art may understand that the network-connecting apparatus and method may be applied to a direct connection among network devices existing in a network having an address system according to the IPv6 and to a direct connection among network devices existing in a network having different address systems.

With the network-connecting apparatus and method according to the disclosed teachings, a direct connection between network devices existing in different private networks is possible. Therefore, it is available to provide new services such as P2P services, Home-to-Home services, and the like, using a private network. In addition, even in information exchanges, secrecy may be guaranteed since information is not recorded in a storage device of an internet service provider, as well as perfect security may be maintained with application of individual security codes between private networks.

Although the preferred embodiment of the present invention has been described, it will be understood by those skilled in the art that the present invention should not be limited to the described preferred embodiment, but various changes and modifications can be made within the spirit and scope of the present invention as defined by the appended claims.

What is claimed is:

1. A network-connecting apparatus for a first private network having a first network device, the apparatus comprising:
    a direct connection part for providing a direct connection by forming a tunnel with a second private network in response to a connection request from the first network device, said request being a request to connect to a second network device in a second private network, wherein the direct connection part comprises:
        an address acquisition part for acquiring a public IP address of the second private network from a domain name management server based on a domain name of the second network device received from the first network device, and for acquiring a private IP address of the second network device based on the received domain name, wherein the acquired private IP address is a destination address having a subnet number of the destination address of a packet to be transferred outside the first private network; and
        a connection management part for connecting to the second private network based on the acquired public IP address and forming the tunnel with the second private network:
    an address mapping part for converting the acquired public IP address and the acquired private IP address into an address system used in the first private network in case an address system used for the public IP address of the second private network is different from the address system used for the public IP address of the first private network; and
    an address change part for changing the subnet number of the destination address through the direct connection to a tunnel number allocated to the tunnel, changing a subnet number of an origination address of the packet to the tunnel number, and changing the tunnel number of the destination address to the subnet number of the destination address when the packet is transferred to the second network device.

2. The network-connecting apparatus as claimed in claim 1, wherein the address change part comprises:
    a number acquisition part for receiving the tunnel number from the second private network; and
    a change part for changing the subnet number of the origination address of the packet transferred outside the first private network through the direct connection to the tunnel number, and for changing the destination address of the packet to the acquired private IP address.

3. The network-connecting apparatus as claimed in claim 1, further comprising:
    a registration request part for requesting a registration of a public IP address from the domain name management server, said public address being allocated from a unique domain name and internet service providing device through a communication network.

4. The network-connecting apparatus as claimed in claim 1, wherein the address change part comprises:
    a number assignment part for assigning the tunnel number to the tunnel; and a change part for changing the subnet number of the origination address of the packet transferred outside the first private network through the direct connection to the tunnel number, and for changing the destination address of the packet to the private IP address of the second network device, wherein the private IP address is the destination address having the subnet number of the destination address.

5. The network-connecting apparatus as claimed in claim 4, wherein the number assignment part assigns a number that is not a subnet number of the private IP address allocated to be the second network device.

6. The network-connecting apparatus as claimed in claim 1, further comprising an authentication part for authenticating the second network device, wherein the direct connection part provides a direct connection in case of receiving a connection approval signal from the authentication part.

7. A network-connecting method for establishing connection between a first network device in a first private network and a second network device in a second private network, the method comprising:
    a) providing a direct connection in response to a connection request from the first network device to be connected to the second network device, wherein the providing of the direct connection comprises;
   ai) acquiring a public IP address of the second private network from a domain name management server based on a domain name of the second network device received from the first network device;
   aii) connecting to the second private network based on the acquired public IP address; and
   aiii) forming a tunnel with the second private network;
b) forming the tunnel to which a unique tunnel number is allocated;
c) acquiring a private IP address of the second network device;
d) changing a subnet number of the acquired private IP address of the second network device to the tunnel number;
e) changing a subnet number of an origination address of a packet transferred outside the first private network through the direct connection to the tunnel number; and
f) changing the tunnel number of the acquired private IP address of the second network device to the subnet number of the acquired private IP address of the second network device when the packet is transferred to the second network device.
   wherein prior to operation d), the acquired public IP address and acquired private IP address are mapped into an address system used in the first private network address in case the address system used for the public address by the first private network is different from an address system used for the public IP address in the second private network.

8. The network-connecting method as claimed in claim 7, wherein prior to the direct connection, the domain name management server is requested to register a public IP address allocated from a unique domain name and internet service providing device through a communication network.

\* \* \* \* \*